US008155907B1

(12) United States Patent  
Lesea et al.

(10) Patent No.: US 8,155,907 B1  
(45) Date of Patent: Apr. 10, 2012

(54) METHODS OF ENABLING FUNCTIONS OF A DESIGN TO BE IMPLEMENTED IN AN INTEGRATED CIRCUIT DEVICE AND A COMPUTER PROGRAM PRODUCT

(75) Inventors: Austin H. Lesea, Los Gatos, CA (US); Stephen M. Trimberger, San Jose, CA (US); Christopher H. Kingsley, Longmont, CO (US); Satyaki Das, San Jose, CA (US); Tim Tuan, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 457 days.

(21) Appl. No.: 12/480,488

(22) Filed: Jun. 8, 2009

(51) Int. Cl.
G06F 11/00 (2006.01)
G06F 19/00 (2011.01)
G06F 17/40 (2006.01)

(52) U.S. Cl. .......... 702/79; 702/108; 702/182; 702/187; 713/503; 716/101; 716/136

(58) Field of Classification Search ............ 73/1.01, 73/432.1, 865.8, 865.9; 324/500, 537, 762.01, 324/762.02, 762.03, 762.05, 762.06, 763.01; 368/89; 702/1, 57, 79, 85, 89, 90, 108, 109, 702/127, 176, 182, 186, 187, 189; 713/500, 713/502, 503; 716/100, 101, 106, 108, 110, 716/111, 113, 132, 134, 136
See application file for complete search history.

(56) References Cited

U.S. PATENT DOCUMENTS 3,082,374 A * 3/1963 Buuck ......................... 324/73.1
3,882,386 A * 5/1975 Vinsani ....................... 324/73.1
4,564,943 A * 1/1986 Collins et al. ................ 714/745
4,821,269 A * 4/1989 Jackson et al. ............... 714/724
5,675,265 A * 10/1997 Yamamori ...................... 327/3
(Continued)

FOREIGN PATENT DOCUMENTS

GB 2221044 A * 1/1990

OTHER PUBLICATIONS

Cheng, Lerong et al., "FPGA Performance Optimization Via Chipwise Placement Considering Process Variations," *Proc. of the 16th Annual International Conference on Field Programmable Logic and Applications*, Aug. 28-30, 2006, pp. 1-6, Madrid, Spain.

(Continued)

*Primary Examiner* — Edward Cosimano
(74) *Attorney, Agent, or Firm* — John J. King

(57) ABSTRACT

Methods of enabling functions of a design to be implemented in an integrated circuit device are disclosed. An exemplary method comprises applying test data to a plurality of dice having different element types for implementing circuits, wherein the plurality of dice have a common layout of the different element types for implementing the circuits; receiving output data from the plurality of dice in response to applying the test data to the plurality of dice; analyzing the output data from the plurality of dice; transforming by a computer the output data to characterization data comprising timing data associated with the different element types for implementing circuits, wherein the characterization data comprises data associated with regions of the dice, and storing the characterization data. A computer program product for enabling functions of a design to be implemented in an integrated circuit device is also disclosed.

20 Claims, 11 Drawing Sheets

U.S. PATENT DOCUMENTS

| | | | | |
|---|---|---|---|---|
| 6,134,191 | A * | 10/2000 | Alfke | 368/118 |
| 6,222,407 | B1 * | 4/2001 | Gregor | 327/269 |
| 7,412,343 | B2 * | 8/2008 | Stroud et al. | 702/120 |
| 8,001,439 | B2 * | 8/2011 | Ong | 714/742 |
| 2005/0154552 | A1 * | 7/2005 | Stroud et al. | 702/120 |
| 2007/0067687 | A1 * | 3/2007 | Ong | 714/731 |
| 2007/0079204 | A1 * | 4/2007 | Ong | 714/738 |
| 2011/0251819 | A1 * | 10/2011 | Ong | 702/120 |
| 2011/0276302 | A1 * | 11/2011 | Rivoir | 702/117 |

OTHER PUBLICATIONS

Katsuki, Kazuya et al., "A Yield and Speed Enhancement Scheme under Within-die Variations on 90nm LUT Array," *Proc. of the IEEE 2005 Custom Integrated Circuits Conference*, Sep. 18-21, 2005, pp. 601-604, San Jose, California, USA.

XILINX, Inc., *Virtex-5 FPGA Data Sheet: DC and Switching Characteristics*, DS202 (V5.1), Apr. 1, 2009, earliest publication v1.0 on Apr. 14, 2006, pp. 1-91, available from Xilinx, Inc., San Jose, California, USA.

\* cited by examiner

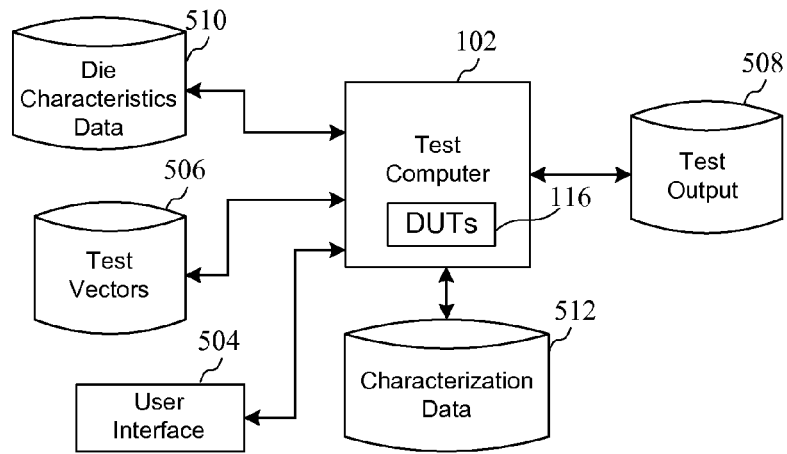

FIG. 5

TEST OUTPUTS

| Device Number | ELEMENT Type | XY Location | Characteristic | Delay Spec |
|---|---|---|---|---|
| 1 | IOB | x= 0.00122<br>y= 0.00136 | CE1 Setup and hold with respect to clock<br>D pin setup and hold without delay<br>D pin to O pin propagation dealy<br>⋮ | 1.32 nsec<br>1.32 nsec<br>1.32 nsec<br>⋮ |
| 2 | BRAM | x= 0.00142<br>y= 0.00176 | Clock to dataout without output register<br>Clock to dataout with output register<br>D pin setup and hold without delay<br>⋮ | 0.68 nsec<br>0.98 nsec<br>1.32 nsec<br>⋮ |
| 3 | CLB | x= 0.00139<br>y= 0.00146 | AX input to AMUX output<br>AX input to BMUX output<br>AX input to CMUX output<br>⋮ | 0.32 nsec<br>0.37 nsec<br>0.33 nsec<br>⋮ |
| 4 | CLB | x= 0.00177<br>y= 0.00116 | AX input to AMUX output<br>AX input to BMUX output<br>AX input to CMUX output<br>⋮ | 0.35 nsec<br>0.36 nsec<br>0.33 nsec<br>⋮ |
| 5 | DSP | x= 0.00152<br>y= 0.00184 | A input to P register clock<br>C input to P register clock<br>PCIN to P register clock<br>⋮ | 0.26 nsec<br>0.30 nsec<br>0.33 nsec<br>⋮ |
| ⋮ | ⋮ | ⋮ | ⋮ | ⋮ |

FIG. 6

Characterization Data

| Region | Device Type | Characteristic | Delay Specification | | |
|---|---|---|---|---|---|
| | | | | ••• | |
| 1 | IOB | CE1 Setup and hold with respect to clock<br>D pin setup and hold without delay<br>D pin to O pin propagation dealy<br>⋮ | 1.32 nsec<br>1.31 nsec<br>1.37 nsec<br>⋮ | | 1.32 nsec<br>1.31 nsec<br>1.37 nsec<br>⋮ |
| | BRAM | Clock to dataout without output register<br>Clock to dataout with output register<br>D pin setup and hold without delay<br>⋮ | 0.68 nsec<br>0.98 nsec<br>0.72 nsec<br>⋮ | | 0.68 nsec<br>0.98 nsec<br>0.72 nsec<br>⋮ |
| | CLB | AX input to AMUX output<br>AX input to BMUX output<br>AX input to CMUX output<br>⋮ | 0.35 nsec<br>0.36 nsec<br>0.33 nsec<br>⋮ | | 0.35 nsec<br>0.36 nsec<br>0.33 nsec<br>⋮ |
| | DSP | A input to P register clock<br>C input to P register clock<br>PCIN to P register clock<br>⋮ | 0.26 nsec<br>0.30 nsec<br>0.33 nsec<br>⋮ | | 0.26 nsec<br>0.30 nsec<br>0.33 nsec<br>⋮ |
| 2 | IOB | CE1 Setup and hold with respect to clock<br>D pin setup and hold without delay<br>D pin to O pin propagation dealy<br>⋮ | 1.32 nsec<br>1.33 nsec<br>1.42 nsec<br>⋮ | | 1.32 nsec<br>1.33 nsec<br>1.42 nsec<br>⋮ |
| | BRAM | Clock to dataout without output register<br>Clock to dataout with output register<br>D pin setup and hold without delay<br>⋮ | 0.68 nsec<br>0.88 nsec<br>0.78 nsec<br>⋮ | | 0.68 nsec<br>0.88 nsec<br>0.78 nsec<br>⋮ |
| | CLB | AX input to AMUX output<br>AX input to BMUX output<br>AX input to CMUX output<br>⋮ | 0.35 nsec<br>0.38 nsec<br>0.33 nsec<br>⋮ | | 0.35 nsec<br>0.38 nsec<br>0.33 nsec<br>⋮ |
| | DSP | A input to P register clock<br>C input to P register clock<br>PCIN to P register clock<br>⋮ | 0.27 nsec<br>0.32 nsec<br>0.33 nsec<br>⋮ | | 0.27 nsec<br>0.32 nsec<br>0.33 nsec<br>⋮ |
| 16 | IOB<br>⋮ | CE1 Setup and hold with respect to clock<br>⋮ | 1.39 nsec<br>⋮ | | 1.39 nsec<br>⋮ |
| | ⋮ | ⋮ | ⋮ | | ⋮ |

FIG. 7

Nominal Values

| Element Type | Characteristic | Delay Specification | | |
|---|---|---|---|---|
| | | Speed -5 | ⋯ | Speed -1 |
| IOB | CE1 Setup and hold with respect to clock<br>D pin setup and hold without delay<br>D pin to O pin propagation dealy<br>⋮ | 1.32 nsec<br>1.31 nsec<br>1.37 nsec<br>⋮ | ⋮ | 1.32 nsec<br>1.31 nsec<br>1.37 nsec<br>⋮ |
| BRAM | Clock to dataout without output register<br>Clock to dataout with output register<br>D pin setup and hold without delay<br>⋮ | 0.68 nsec<br>0.98 nsec<br>0.72 nsec<br>⋮ | ⋮ | 0.68 nsec<br>0.98 nsec<br>0.72 nsec<br>⋮ |
| CLB | AX input to AMUX output<br>AX input to BMUX output<br>AX input to CMUX output<br>⋮ | 0.35 nsec<br>0.36 nsec<br>0.33 nsec<br>⋮ | ⋮ | 0.35 nsec<br>0.36 nsec<br>0.33 nsec<br>⋮ |
| DSP | A input to P register clock<br>C input to P register clock<br>PCIN to P register clock<br>⋮ | 0.26 nsec<br>0.30 nsec<br>0.33 nsec<br>⋮ | ⋮ | 0.26 nsec<br>0.30 nsec<br>0.33 nsec<br>⋮ |

Table 1

Scaling Factors

| Region | Scaling Factor | | |
|---|---|---|---|
| | Speed -5 | ⋯ | Speed -1 |
| 1 | 1.01 | ⋯ | 1.05 |
| 2 | 1.10 | ⋯ | 1.12 |
| 3 | 0.99 | ⋯ | 0.96 |
| 4 | 1.21 | ⋯ | 1.18 |
| ⋮ | 0.99 | ⋯ | 0.99 |
| 16 | 0.96 | ⋯ | 0.97 |

Table 2

FIG. 8

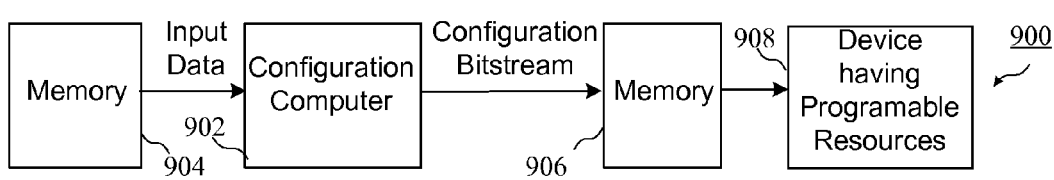

FIG. 9

METHODS OF ENABLING FUNCTIONS OF A DESIGN TO BE IMPLEMENTED IN AN INTEGRATED CIRCUIT DEVICE AND A COMPUTER PROGRAM PRODUCT

FIELD OF THE INVENTION

The present invention relates generally to integrated circuit devices, and in particular, to methods of enabling functions of a design to be implemented in an integrated circuit device, and to computer program products for enabling functions of a design to be implemented in an integrated circuit device.

BACKGROUND

Integrated circuit devices may experience significant variations due to manufacturing imperfections. A large portion of these variations are found in all dice, and are therefore characterized as systematic variations. Any remaining variations are unpredictable and are therefore characterized as random variations. A conventional timing characterization of integrated circuit devices specifies resource delays such that a certain percentage of dice do not violate resource delay specifications. The percentage of devices that do not violate the resource delay specifications is known as a timing yield. Because conventional timing characterization methods do not account for the fact that certain resources of a device may be consistently faster, conventional speed characterization methods lead to pessimistic resource delay specifications.

It is common for large silicon dice to exhibit variations in the performance of logic elements and interconnect elements. These variations may be due to lithography, mask making, or some other process required in the manufacturing of the integrated circuit devices. Checking for variations between dice is generally done by the testing a large number of dice in order to identify and correct any variations. After all improvements to the process are made at the fabricator of the devices, any remaining variation must be taken into account by de-rating the dice, where timing data for the slowest elements are used to characterize the devices. However, such a characterization may be unduly pessimistic and may not accurately reflect the speed of the device.

SUMMARY

Computer implemented methods of enabling functions of a design to be implemented in an integrated circuit device are disclosed. An exemplary method comprises applying test data to a plurality of dice having different element types for implementing circuits, wherein the plurality of dice have a common layout of the different element types for implementing the circuits; receiving output data from the plurality of dice in response to applying the test data to the plurality of dice; analyzing the output data from the plurality of dice; transforming by a computer the output data to characterization data comprising timing data associated with the different element types for implementing circuits, wherein the characterization data comprises data associated with regions of the plurality of dice, and storing the characterization data.

According to other embodiments, the method may further comprise applying generic test vectors to the plurality of dice before applying the test data to the plurality of dice. The method may further comprise identifying the regions of the plurality of dice based upon initial output data from the plurality of dice in response to applying the generic test vectors to the plurality of dice, wherein applying test data may comprise applying targeted test vectors to the regions. Transforming the output data to characterization data may comprise generating the characterization data for the plurality of dice based upon systematic variations in timing characteristics of the elements and/or random variations in the different element types. The method may further comprise testing integrated circuit packages comprising dice implemented by using the characterization data.

According to an alternate embodiment, a computer implemented method of enabling functions of a design to be implemented in an integrated circuit device may comprise receiving a high level implementation of a circuit design; accessing characterization data associated with the integrated circuit device, wherein the characterization data provides timing information associated with regions of the integrated circuit device for the different element types of the integrated circuit device; transforming by a computer the high level implementation of the circuit design to a configuration of the different element types of the integrated circuit device; generating a configuration bitstream for the integrated circuit device based upon the configuration of the different element types; and storing the configuration bitstream.

According to other embodiments, accessing characterization data may comprise accessing data which accounts for systematic variation and/or random variation between timing characteristics for the different element types in the regions of the integrated circuit device. Transforming the high level implementation of the circuit design may comprise determining a placement of the circuit design based upon the timing information associated with the regions, and more particularly placing portions of the circuit having stricter timing requirements in a faster region of the regions of the dice. The method may further comprise programming the integrated circuit device, wherein the integrated circuit device comprises a device having programmable elements.

A computer program product is also disclosed. The computer program code may comprise a computer-readable medium storing computer-executable program code that enables functions of a design to be implemented in an integrated circuit, the computer-executable code comprising instructions that when executed by a computer cause the computer to perform operations including: applying test data to a plurality of dice having different element types for implementing circuits, wherein the plurality of dice have a common layout of the different element types for implementing the circuits; receiving output data from the plurality of dice in response to applying the test data to the plurality of dice; analyzing the output data from the plurality of dice; and transforming the output data to characterization data comprising timing data associated with the different element types for implementing circuits, wherein the characterization data comprises data associated with regions of the plurality of dice.

According to other embodiments, the operations may further include applying generic test vectors to the plurality of dice before applying the test data to the plurality of dice. The operations may further include identifying the predetermined regions of the plurality of dice based upon initial output data from the plurality of dice in response to applying the generic test vectors to the plurality of dice. The operation of applying test data may comprise applying targeted test vectors to the predetermined regions. The operation of transforming the output data to characterization data may comprise computer-readable program code that generates the characterization data for the plurality of dice based upon systematic variations and/or random variations in timing characteristics of the different element types. The operations may further include testing integrated circuit packages having the plurality of dice implemented by using the characterization data.

BRIEF DESCRIPTION OF THE DRAWINGS

FIG. 5 is a functional block diagram showing a system for generating characterization data according to an embodiment of the present invention;

FIG. 6 is a table showing an example of output data generated by the system of FIG. 5 according to an embodiment of the present invention;

FIG. 7 is a table showing an example of characterization data generated based upon the output data in the table of FIG. 6 according to an embodiment of the present invention;

FIG. 8 is a pair of tables showing an example of characterization data generated based upon the output data in the table of FIG. 6 according to an alternate embodiment of the present invention;

FIG. 9 is a block diagram of a system for programming an integrated circuit device having programmable elements according to an embodiment of the present invention;

DETAILED DESCRIPTION

Figure 1:
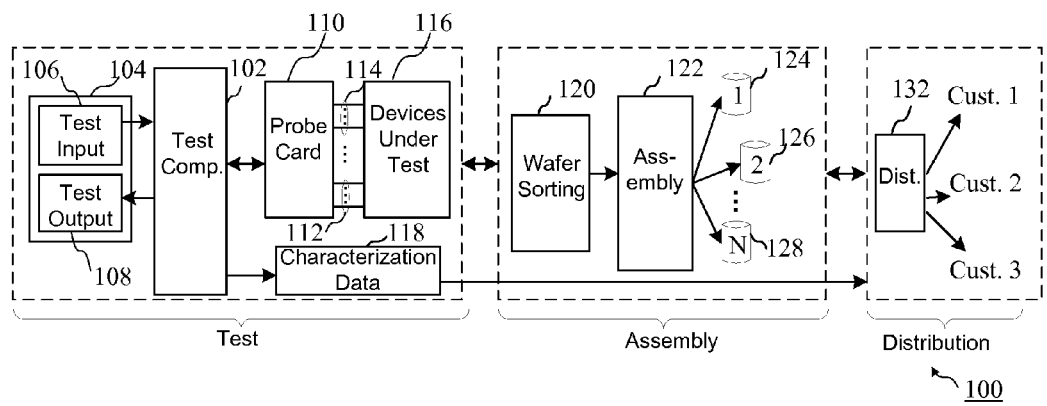
FIG. 1 is a block diagram of a system for enabling functions of a design to be implemented in an integrated circuit device according to an embodiment of the present invention.

Turning first to FIG. 1, a block diagram of a system 100 for enabling functions of a design to be implemented in an integrated circuit device is shown. In particular, a test computer 102 is coupled to a memory device 104 having test inputs 106 which may be coupled to the test computer 102 and test outputs 108 which may be received from the test computer 102. The test computer 102 may be any type of computer or system for testing dice of a wafer to determine defects in the dice. For example, the test computer 102 may include a wafer tester from Credence Systems Corporation of Milpitas, Calif. or Teradyne Inc. of North Reading, Mass. An example of a wafer having a plurality of dice will be described in more detail in reference to FIG. 2. The wafers are tested in a process known as "wafer sort" before the dice are separated from the wafer. The test computer 102 is coupled to a probe card 110 which comprises groups of test probes. The groups of test probes are shown by way of example in FIG. 1 as test probe groups 112 and 114, where each test probe group is coupled to a device under test of a plurality of devices under test 116 of the wafers. While the memory device 104 and the probe card 110 of the system 100 are shown separate from the test computer 102, they may be a part of the test computer. The test computer 102 generates characterization data 118 based upon output data received at the test computer 102 by way of the probe card. As will be described in more detail below, the characterization data not only provides more accurate timing values for elements of the device, but also characterization data associated with different regions of a die.

Tested wafers are then provided to an assembly area, where a wafer sorting device 120 enables assembling a batch of wafers into integrated circuit packages using an assembly tool 122. During the assembly process, integrated circuit packages may then be sorted into various bins 124-128 based on characteristics of the dice in a process known as binning. The binning is performed according to predetermined criteria. On common criterion for binning is based upon a speed grade that indicates a speed of a given integrated circuit device with respect to a minimum speed for that device. While the devices are generally provided with a certain speed for the majority of the devices, some devices may be "de-rated," or given a lower speed grade. After binning, the integrated circuit packages are sent to a distribution region 132, where the integrated circuit packages are then provided to one or more customers.

The characterization data may be generated after providing test inputs to a predetermined number of dice, such as 5000 dice. The generated characterization data will apply to all of the dice produced thereafter until some change is made to elements of the integrated circuit device or a fabrication process which would require new characterization data to be generated. Alternatively, the characterization data can be generated for smaller numbers of dice. For characterization data which is provided with smaller volumes of dice, the characterization data may be associated with dice that are specifically identified, such as by using a serial number for the integrated circuit devices for example. The characterization data 118 generated by the test computer 102 is made available to the customers who receive the integrated circuit packages, either directly from the distribution region with the integrated circuit packages or through a variety of other media. For example, the characterization data may be provided in a data specification sheet or may be accessible online from a manufacturer of the device.

Figure 2:
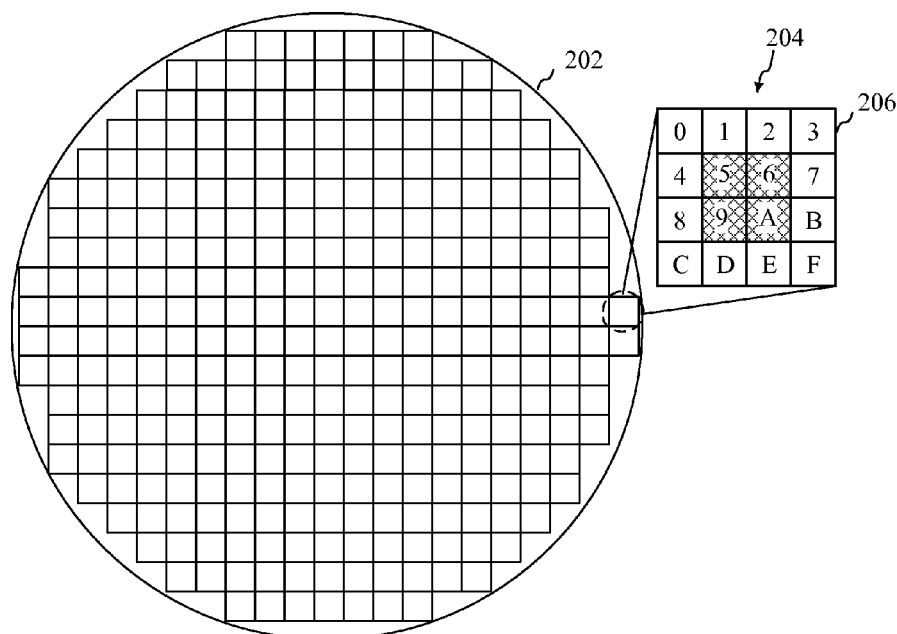
FIG. 2 is a top plan view of a wafer having dice for integrated circuit devices according to an embodiment of the present invention.

FIG. 2 is a top plan view of a wafer having dice for integrated circuit devices according to an embodiment of the present invention. In particular, FIG. 2 shows a wafer 202 comprising silicon or some other semiconductor material having dice represented by the squares. Die 204 may be any kind of integrated circuit, such as microprocessors, programmable logic devices (PLDs) or application-specific integrated circuits (ASICs). An enlarged view of one of the die 204 shows a die having 16 numbered regions 206 including a shaded region in the center having 4 of the 16 regions. While the regions shown in FIG. 2 include square regions of the same size by way of example, the regions need not be the same size or shape, or evenly distributed on the die. For example, smaller regions may be defined within a given region which may be considered to have significant variations within the region. While the example of FIG. 2 shows the use of equally sized squares, timing characteristics may be associated with a "tile" having elements associated with a particular function, as will be described in more detail in reference to FIG. 10. Also, regions need not be defined only by the physical location of elements, but may be defined by some other convenient collections of elements. Regions 206 may be fixed function or may be programmable.

Figure 3:
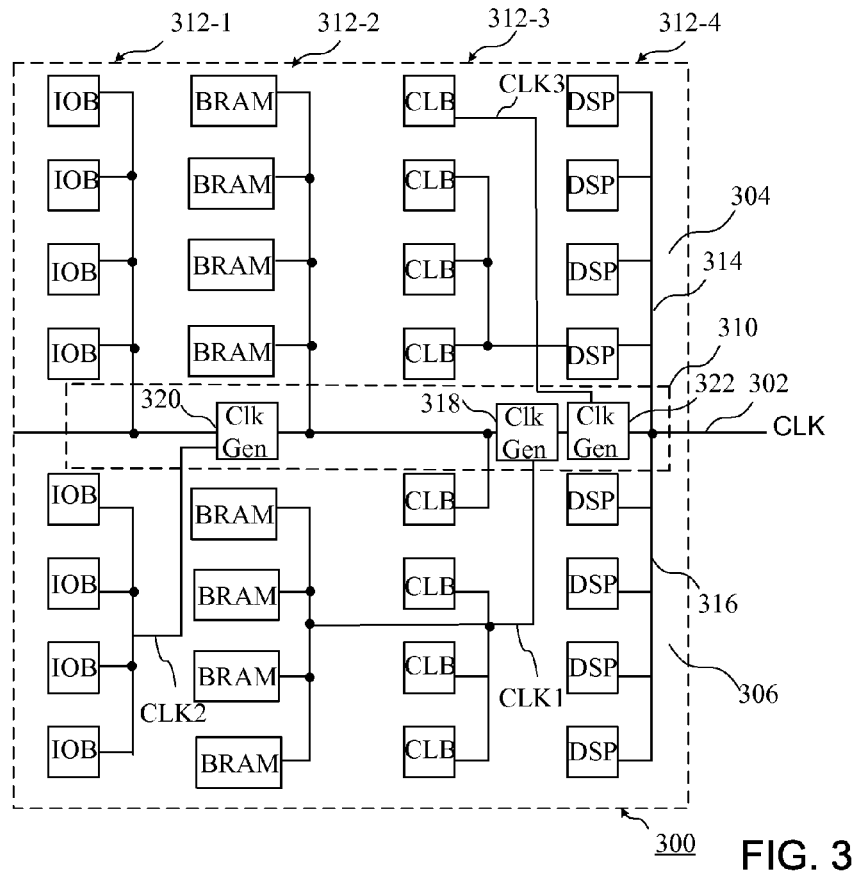
FIG. 3 is a block diagram of an integrated circuit having programmable elements according to an embodiment of the present invention.

FIG. 3 is a block diagram of an integrated circuit device 300 having programmable elements according to an embodiment of the present invention. As will be described in more detail below, the programmable elements may be a part of a programmable logic device (PLD), or some other device having programmable logic, such as an application specific integrated circuit (ASIC) having portions that are programmable. A clock (CLK) signal first enters a region on one side of the device and travels along a horizontal clock row 302. An upper portion 304 of the device above the horizontal clock row 302 and a lower portion 306 of the device below the horizontal clock row 302 receive clock signals from the horizontal clock row 302 or clock generators in a center row 310. A plurality of columns, shown here as columns 312-1 through 312-4, include blocks of programmable elements. In particular, column 312-1 includes input/output blocks (IOBs), column 312-2 includes blocks of random access memory (BRAMs), column 312-3 includes configurable logic blocks (CLBs), and column 312-4 includes digital signal processor (DSP) blocks. Clock signals are routed to the various blocks by vertical clock trees, such as a clock tree 314 extending up from the horizontal clock row or a clock tree 316 extending down from the horizontal clock row. The circuit of FIG. 3 may include many more columns of blocks and may have different types of blocks, as will be described below in more detail in reference to the circuit of FIG. 10.

A sub-set of the logic blocks is related to clock synthesis and clock modification. Clock synthesis is the process of creating a clock signal at a specific frequency and duty cycle. Clock modification is the process of modifying the clock frequency or duty cycle of an existing clock signal or phase aligning a clock signal relative to another clock signal. As shown in FIG. 3, a first clock generator 318 generates a first clock signal (CLK1) coupled to a group of CLBs and BRAMS in the lower portion 306. A second clock generator 320 generates a second clock signal (CLK2) which is coupled to a group of IOBs in the lower portion 306. A third clock generator 322 generates a third clock signal (CLK3) which is coupled to a CLB in the upper portion 304. The remaining logic blocks are coupled to receive the CLK signal.

Figure 4:
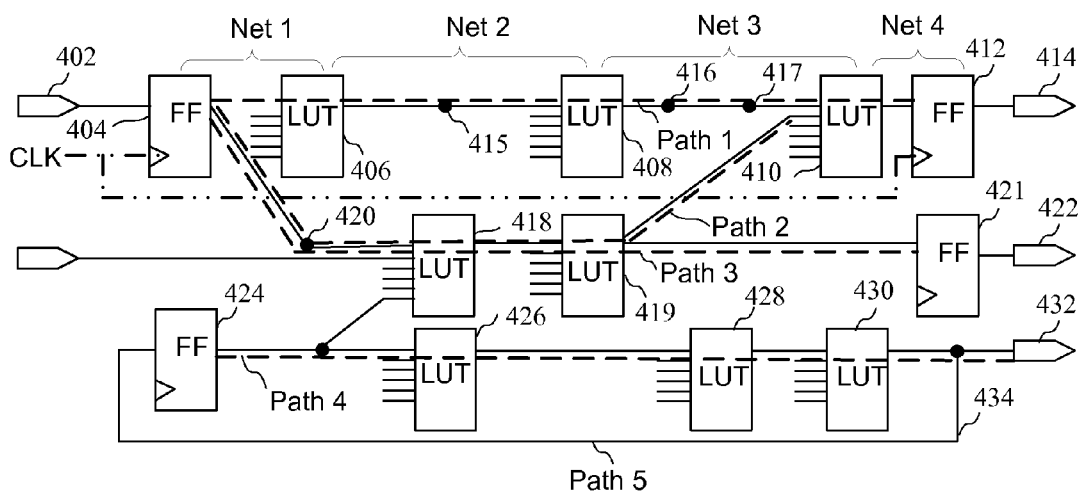
FIG. 4 is a block diagram showing connections between elements of an integrated circuit device according to an embodiment of the present invention.

FIG. 4 is a block diagram showing connections between elements of an integrated circuit device according to an embodiment of the present invention. The block diagram of FIG. 4 shows a device having registers, shown here as flip-flops (FFs), and may include other elements, such as lookup tables (LUTs) of CLBs. Details regarding a lookup table are provided in more detail in reference to the configurable logic element of FIG. 11. The registers receive data signals and clock signals as shown, and various nets and paths are coupled by interconnect lines between registers. Delay estimates for circuits implemented in integrated circuit devices may be based upon nets or paths between registers, for example, and may depend upon the delay characteristics of the elements, such as CLBs, of the integrated circuit devices. A net represents a collection of interconnect segments from the output of a user logic block such as a lookup table to inputs of the next destination user logic block. A path represents a sequence of nets between registers and includes a connection from a source register to a load register. A path may be defined as a clock-to-clock path, such as a path from one register to another register, a register to an output, an input to a register, or an input to an output, as is well known in the art. While FIG. 4 is shown in terms of lookup tables, it should be understood that other logic blocks may be used, and that the example of FIG. 4 is provided to shown how delay characteristics are based upon both interconnects and elements of an integrated circuit device.

Referring specifically to FIG. 4, an input/output (I/O) port 402, which may include an input for receiving data, is coupled to an input of a register 404, the output of which is coupled to an input of a LUT 406. While some inputs of LUTs and registers in FIG. 4 are shown without nets attached, these nets may connect to other LUTs or flip-flops, but are omitted for clarity. The output of the LUT 406 is coupled to a second LUT 408, the output of which is coupled to a third LUT 410. The output of the LUT 410 is coupled to a register 412, which is coupled to an I/O port 414.

Accordingly, there are 4 nets associated with a Path 1 which extends from register 404 to register 412 by way of LUT 406, LUT 408 and LUT 410. In particular, a first net (Net1) is defined between register 404 and the LUT 406. A second net (Net 2) is defined between LUT 406 and LUT 408, and includes one interconnect point 415 connecting two interconnect segments. The interconnect point may include a programmable interconnect point (PIP), which may be a programmable multiplexing network. A third net (Net3) extending from the LUT 408 to the LUT 410 includes two interconnect points 416 and 417 connecting interconnect segments. Finally, a fourth net is defined between the LUT 410 and the register 412.

A second path, Path 2, between the register 404 and the register 412 is shown extending through LUTs 418 and 419 by way of an interconnect point 420, and back to LUT 410. While Path 1 and Path 2 have the same number of LUTs between the same registers, they extend through different LUTs and interconnect points. Accordingly, Path 1 and Path 2 may have different delays. A third path, Path 3, extends from register 404, through LUTs 418 and 419 to a register 421, the output of which is coupled to an I/O port 422. Finally, the output of a register 424 is coupled by way of LUTs 426, 428, and 430 to an I/O port 432, as shown by Path 4. A feedback loop 434 is also shown, which would be considered a separate path, designated as Path 5. The interconnect points provide input flexibility between a general interconnect structure of the integrated circuit device and configurable elements, such as the LUTs in FIG. 4.

The connection from the output of one LUT to the input of another LUT may be established by a number of different nets that may have different delays. While nets may be selected to meet a minimum delay between the LUTs, multiple elements of a circuit may compete for the same interconnect resources, making efforts to meet a delay requirement challenging. Different elements of the circuit may be clocked by different clock signals as described in reference to FIG. 3.

FIG. 5 is a functional block diagram showing a system for generating characterization data for an integrated circuit device according to an embodiment of the present invention. In particular, the test computer 102 includes a plurality of devices under test (DUTs) 116. A user interface 504 enables the application of test vectors to the DUTs from a test vector database 506. The test vectors may include data coupled to predetermined input pins of the DUTs, while a test output data base 508 receives output vectors having data values detected at predetermined output pins of the DUTs. A die characteristics database may include a representation of regions for which characterization data is generated. For example, die characteristics may be selected based upon input from the user interface 504, where the input may indicate which regions are to receive separate characterization data and how the characterization data is formatted. For example, the characterization data may be associated with each of the 16 regions of the die 204, or may be associated with two regions including the shaded center region and the outer region shown in FIG. 2. Finally, characterization data is generated according to a predetermined format defined in the die characteristics database 510, and stored in a characterization data database 512, as will be described in reference to the remaining figures. Examples of formats for storing characterization data are shown in FIGS. 7 and 8.

According to one embodiment of the invention, systematic variations are determined, and characterization data is generated according to regions established based upon the systematic variations. As will be described in more detail below, the timing characteristics may be generated for particular elements of the dice, or may be a scaling factor for nominal data and associated with a location on the dice. However, before specifically discussing the characterization data, it is necessary to describe exemplary output data from which the characterization data is generated.

FIG. 6 is a table showing an example of output data stored in the test output database 508 according to an embodiment of the present invention. In particular, data related to a number of devices is provided, where the element type and location, such as an X-Y coordinate location associated with the element, are shown. Values associated with timing characteristics are generated as output data in response to the application of input data to a plurality of devices under test. The delay specifications of FIG. 6 represent timing delays detected by the test computer for various operations or functions of a given element. For example, device 2, which is a block of random access memory (BRAM) having an X-Y location of x=0.00142 and y=0.00176, is determined to have a delay specification of 0.68 nanoseconds (ns) for a "clock-to-dataout" value when no output register is used. While examples of various characteristics are shown for certain element types in the table of FIG. 6, it should be understood that test outputs would be provided for many other characteristics for the element types shown, as well as for other element types. As will be described in detail below, the numbers of devices and locations of devices tested may depend upon determined characteristics of the device as well as the types of variations which are evaluated, such as systematic or random variations.

Examples of timing characteristics for various element types of an integrated circuit is shown for example in the Virtex-5 FPGA Data Sheet: DC and Switching Characteristic (DS202 (v5.1), available from Xilinx, Inc. of San Jose, Calif., the entire document of which is incorporated by reference. An example of a Virtex-5 FPGA having columns of tiles is shown by way of example in FIG. 10. As will be discussed below, the various timing characteristics can be established for various columns or tiles of the circuit of FIG. 10.

The test outputs of FIG. 6 then may be used by the test computer 102 to generate the characterization data shown in FIG. 7. In particular, delay specifications for four element types (i.e. an IOB, a BRAM, a CLB and a DSP) are shown for each of sixteen regions. The regions of FIG. 7 may be defined by a user and stored in the die characteristics database 510 in response to an analysis of the data in the test output database 508. More particularly, after an analysis of initial output data based upon the application of generic test data, the regions that show variations in delay specifications may be selected as the regions that will require separate delay specifications in the table of FIG. 7. Alternatively, data for certain predefined regions, such as the two regions defined by the shaded and non-shaded regions shown in die 204 of FIG. 2, may be provided regardless of variations in the regions. Accordingly, the elements in the middle of the die may be characterized with one set of delay specifications and elements on the edge of the die may be characterized with another set of delay specifications. Targeted test data may be applied to the determined regions to provide more accurate characterization data. That is, once certain regions are determined to have variations in delay characteristics, targeted test vectors may be applied to characterize the regions to provide more accurate delay specifications. The delay specifications are preferably provided for devices having different speed grades, as will be described in more detail below.

According to an alternate embodiment of characterization data shown in FIG. 8, a first table is created to show representative values for predetermined characteristics associated with certain element types of an integrated circuit device. For example, the representative values may be average values for the characteristics of the various element types over the entire device. A second table is then created to show a scaling factor for predetermined regions of the device. The regions may be defined as set forth above with respect to FIG. 7. The scaling factors may also be established for various speed grades as shown. While a single scaling factor is shown for different characteristics associated with an element type of a device, a different scaling factor may be used for one or more characteristics of an element in some or all of the regions. The scaling factors set forth above may be deduced by comparing measured delays of small paths when implemented in various locations on the die. As will be described in more detail below, the scaling factor may account for random variations around a systematic average for the region. During the assembly process described above in reference to FIG. 1, the timing of the integrated circuit devices may be tested to determine whether the devices meet the published timing characteristics for the devices. Table 2 in FIG. 8 may be used to generate an equation in terms of the region identifier or identifiers or XY location. This equation may be generated by fitting a curve to the data in table 2. This equation may be used in place of table 2 for some calculations. While the tables of FIGS. 7 and 8 are described in reference to devices having programmable elements, it should be understood that the tables of FIGS. 7 and 8 may be generated for other types of devices, including devices having fixed circuits which are identical.

FIG. 9 is a block diagram of a system 900 for programming a device having programmable elements according to an embodiment of the present invention. Regardless of the source of the variations in the die, it may be beneficial to take advantage of determined delay specifications when placing a circuit design in an integrated circuit device. Because systematic variations may exceed 10% when comparing the fastest to slowest performance in some areas of a large die, selectively placing circuits having stricter timing requirements in a faster region of the die may improve performance of the circuit design. That is, if a signal from a source node needs to arrive at a destination node in a relatively short period of time compared to other signals, the circuit for propagating that signal can be placed in regions of the device having shorter delay specifications. In addition to taking advantage of faster nets associated with a faster path of an integrated circuit device, selectively placing circuit elements of the circuit design based upon timing characteristics associated with element types in the various regions enables improved timing performance associated with the implementation of the circuit design. As will be described in more detail, a circuit design may be implemented in a device having programmable elements based upon timing characteristics associated with elements of the various regions as set forth above.

Referring specifically to FIG. 9, a configuration computer 902 is coupled to receive input data stored in a memory 904. The input data includes a circuit design to be implemented in a device having programmable resources 908, such as the elements described above in reference to FIG. 6. The input data may be a circuit design provided in a high level language, such as a hardware description language (HDL) or some other high level implementation of a circuit design. The configuration computer generates a configuration bitstream, coupled to a memory 906, that controls the functionality of the device using configuration data bits of the configuration bitstream. The configuration bitstream will include a placement of elements of the circuit design which takes advantage of the characteristics of the element types according to various regions as defined above.

The software flow for implementing a circuit design in a device having programmable elements includes synthesis, packing, placement, and routing. Synthesis comprises converting a circuit design in a high level design to a configuration of the elements found in the device which is to receive the circuit design. For example, a synthesis tool may implement portions of a circuit design enabling certain functions in CLBs or DSP blocks, as will be described in more detail below. Packing comprises grouping portions of the circuit design into defined blocks, such as CLBs, of a device. Placing comprises determining the location of the blocks of the device to receive the circuits defined during packing, wherein the blocks in a design may be placed on the two-dimensional grid associated with specific elements of the device. Placement is performed by a placer, which may include placement software running on a computer, or a portion of a larger software package running on a computer for implementing a circuit design in a device. Finally, routing comprises selecting paths of interconnect elements, such as programmable interconnects in a device having programmable elements. An example of a synthesis tool which may implement conventional methods of synthesis, packing, placement and routing is the ISE tool available from Xilinx, Inc. of San Jose Calif. However, as will be further described in more detail below, the methods of the present invention provide improvements in the area of placement, where circuits of a circuit design will be placed according to the characterization data for specific regions.

Figure 10:
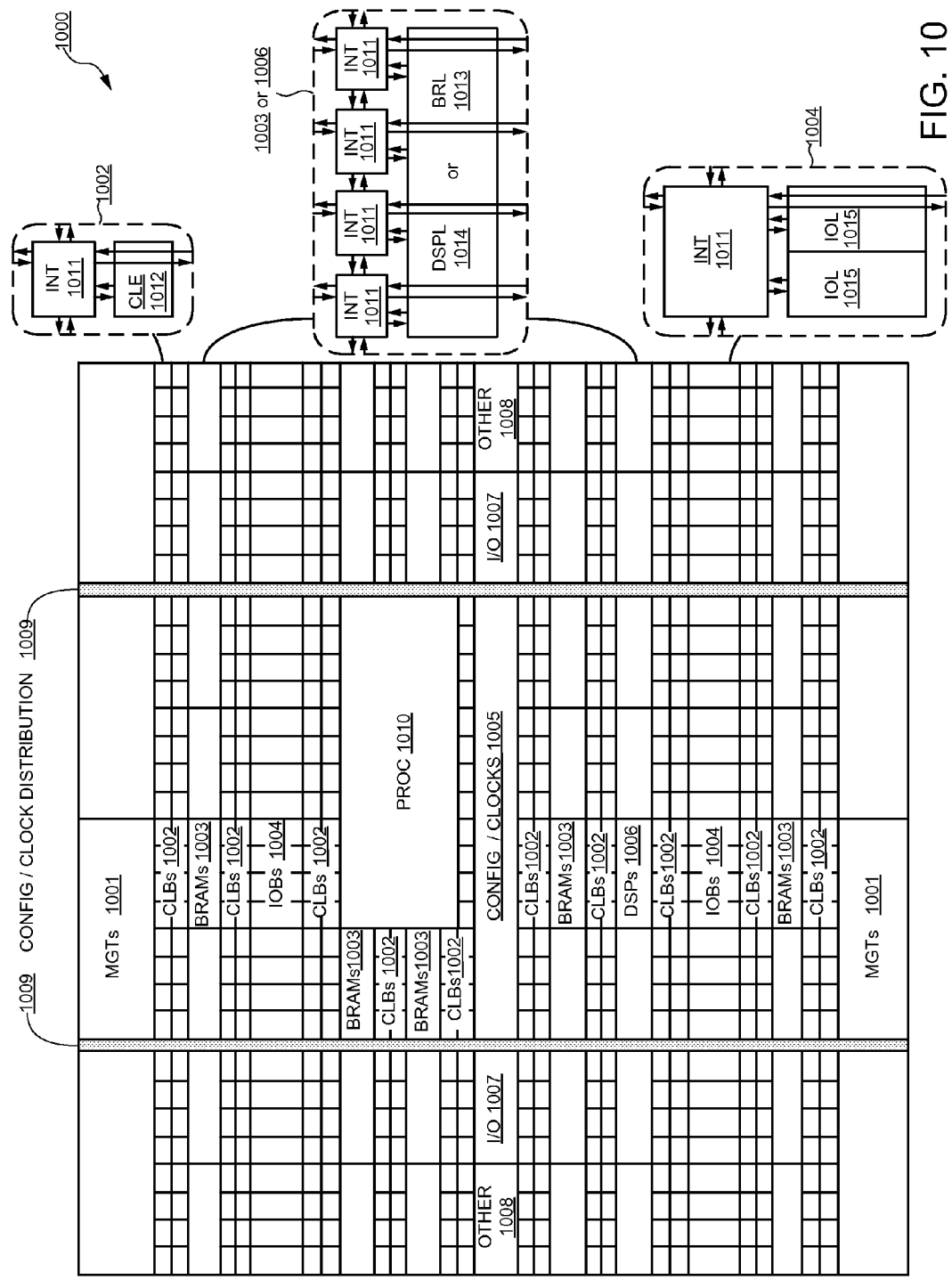
FIG. 10 is a block diagram of an integrated circuit device having programmable elements according to an alternate embodiment of the present invention.

FIG. 10 is a block diagram of a device having identical elements according to an embodiment of the present invention. Identical elements may have fixed function, such as multipliers or memories; or identical elements may be programmable elements. Identical elements may be implemented in any type of integrated circuit device, such as an application specific integrated circuit (ASIC), multi-core processor or memory device. Identical elements are common on devices having programmable logic, such as PLDs, ASICs and other devices that include dedicated PLDs or regions of programmable logic. A PLD is an integrated circuit device designed to be user-programmable so that users may implement logic designs of their choices. One type of PLD is the CPLD. A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA.

The device of FIG. 10 includes an FPGA architecture 1000 having a large number of different programmable tiles including multi-gigabit transceivers (MGTs 1001), configurable logic blocks (CLBs 1002), random access memory blocks (BRAMs 1003), input/output blocks (IOBs 1004), configuration and clocking logic (CONFIG/CLOCKS 1005), digital signal processing blocks (DSPs 1006), specialized input/output blocks (I/O 1007) (e.g., configuration ports and clock ports), and other programmable logic 1008 such as digital clock managers, analog-to-digital converters, system monitoring logic, and so forth. Some FPGAs also include a dedicated processor block (PROC 1010). While a single processor block is shown, multiple dedicate processor blocks may be employed, where the characterization data may include data related to the speeds of the individual processing blocks. Alternatively, the processor block 1010 may comprise a dual core processor, where the characterization data may include data related to the speeds of the different processor cores, alone or in combination with other timing data. The processor may be a hard processor implemented in fixed hardware elements or a soft processor implemented in programmable elements, such as a Microblaze processor, each of which is commonly available on devices from Xilinx, Inc. The methods of enabling functions of a design to be implemented in an integrated circuit device may include enabling functions of a circuit design in elements of the integrated circuit device or enabling functions implemented by software running on a processor which is an element of the integrated circuit device, or a combination of both. That is, the functions may relate to the operation of a configuration of the different elements of a circuit design, such as a configuration of elements defined by a configuration bitstream as described above, or functions defined by software running on a processor or the device.

In some FPGAs, each programmable tile includes a programmable interconnect element (INT 1011) having standardized connections to and from a corresponding interconnect element in each adjacent tile. Therefore, the programmable interconnect elements taken together implement the programmable interconnect structure for the illustrated FPGA. The programmable interconnect element (INT 1011) also includes the connections to and from the programmable logic element within the same tile, as shown by the examples included at the top of FIG. 10.

For example, a CLB 1002 may include a configurable logic element (CLE 1012) that may be programmed to implement user logic plus a single programmable interconnect element (INT 1011). A BRAM 1003 may include a BRAM logic element (BRL 1013) in addition to one or more programmable interconnect elements. The BRAM includes dedicated memory separate from the distributed RAM of a configuration logic block. Typically, the number of interconnect elements included in a tile depends on the height of the tile. In the pictured embodiment, a BRAM tile has the same height as four CLBs, but other numbers (e.g., five) may also be used. A DSP tile 1006 may include a DSP logic element (DSPL 1014) in addition to an appropriate number of programmable interconnect elements. An IOB 1004 may include, for example, two instances of an input/output logic element (IOL 1015) in addition to one instance of the programmable interconnect element (INT 1011). The location of connections of the device is controlled by configuration data bits of a configuration bitstream provided to the device for that purpose. The programmable interconnects, in response to bits of a configuration bitstream, enable connections having interconnect segments to be used to couple the various signals to the circuits implemented in programmable logic, or other circuits such as BRAMs or the processor.

In the pictured embodiment, a columnar area near the center of the die is used for configuration, clock, and other control logic. Horizontal areas 1009 extending from this column are used to distribute the clocks and configuration signals across the breadth of the FPGA. Some FPGAs utilizing the architecture illustrated in FIG. 10 include additional logic blocks that disrupt the regular columnar structure making up a large part of the FPGA. The additional logic blocks may be programmable blocks and/or dedicated logic. For example, the processor block PROC 1010 shown in FIG. 10 spans several columns of CLBs and BRAMs.

Note that FIG. 10 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 10 are purely exemplary. For example, in an actual FPGA more than one adjacent column of CLBs is typically included wherever the CLBs appear, to facilitate the efficient implementation of user logic.

Figure 11:
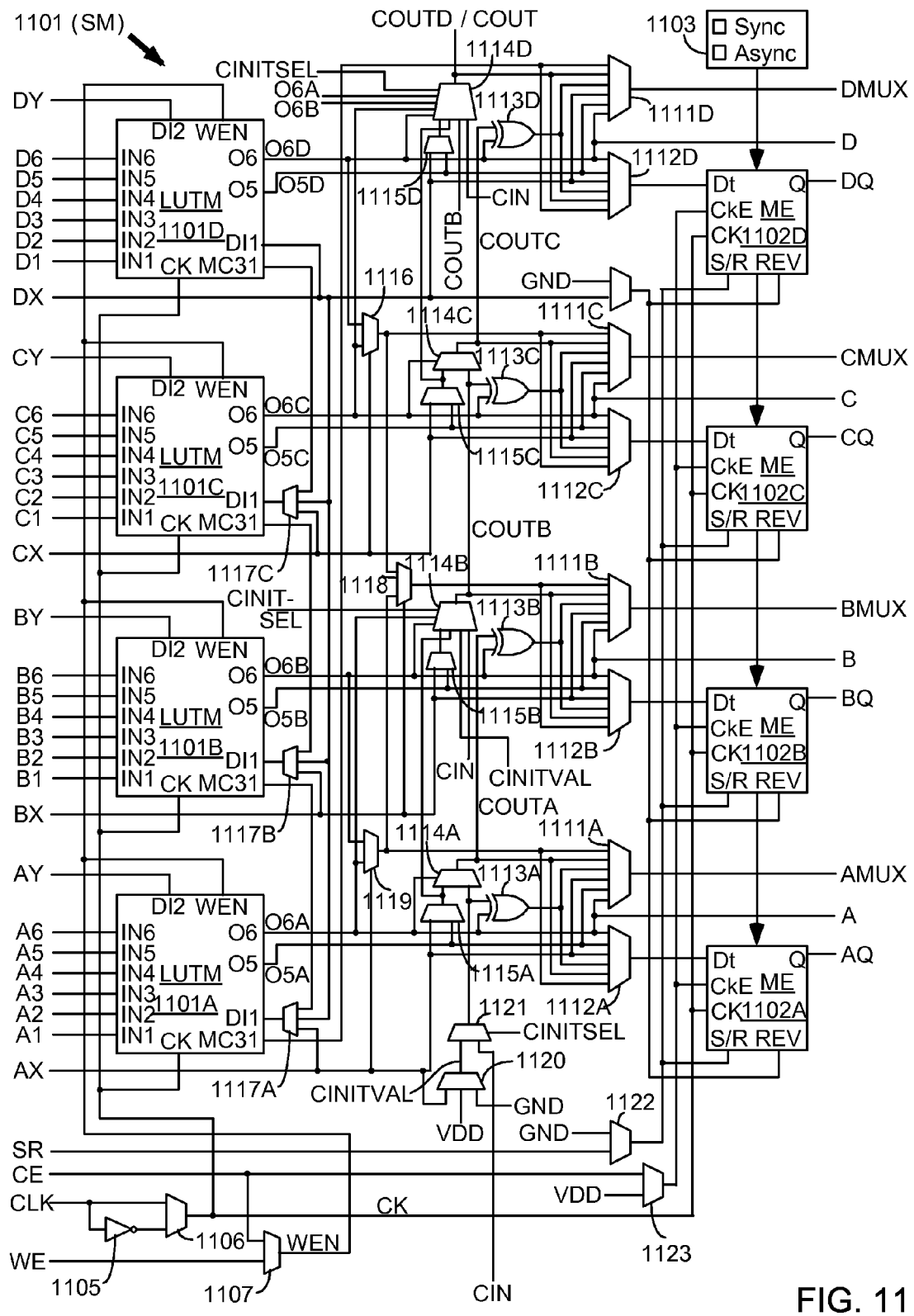
FIG. 11 is a block diagram of a configurable logic element of the device of FIG. 10 according to an embodiment of the present invention.

Turning now to FIG. 11, a block diagram of a configurable logic element of the device of FIG. 10 according to an embodiment of the present invention is shown. In particular, FIG. 11 illustrates in simplified form a configurable logic element of a configuration logic block 1002 of FIG. 10. In the embodiment of FIG. 11, slice M 1101 includes four lookup tables (LUTMs) 1101A-1101D, each driven by six LUT data input terminals A1-A6, B1-B6, C1-C6, and D1-D6 and each providing two LUT output signals O5 and O6. The O6 output terminals from LUTs 1101A-1101D drive slice output terminals A-D, respectively. The LUT data input signals are supplied by the FPGA interconnect structure via input multiplexers, which may be implemented by programmable interconnect element 1011, and the LUT output signals are also supplied to the interconnect structure. Slice M also includes: output select multiplexers 1111A-1111D driving output terminals AMUX-DMUX; multiplexers 1112A-1112D driving the data input terminals of memory elements 1102A-1102D; combinational multiplexers 1116, 1118, and 1119; bounce multiplexer circuits 1122-1123; a circuit represented by inverter 1105 and multiplexer 1106 (which together provide an optional inversion on the input clock path); and carry logic having multiplexers 1114A-1114D, 1115A-1115D, 1120-1121 and exclusive OR gates 1113A-1113D. All of these elements are coupled together as shown in FIG. 11. Where select inputs are not shown for the multiplexers illustrated in FIG. 11, the select inputs are controlled by configuration memory cells. That is, configuration bits of the configuration bitstream stored in configuration memory cells are coupled to the select inputs of the multiplexers to select the correct inputs to the multiplexers. These configuration memory cells, which are well known, are omitted from FIG. 11 for clarity, as well as from other selected figures herein.

In the pictured embodiment, each memory element 1102A-1102D may be programmed to function as a synchronous or asynchronous flip-flop or latch. The selection between synchronous and asynchronous functionality is made for all four memory elements in a slice by programming Sync/Asynch selection circuit 1103. When a memory element is programmed so that the S/R (set/reset) input signal provides a set function, the REV input terminal provides the reset function. When the memory element is programmed so that the S/R input signal provides a reset function, the REV input terminal provides the set function. Memory elements 1102A-1102D are clocked by a clock signal CK, which may be provided by a global clock network or by the interconnect structure, for example. Such programmable memory elements are well known in the art of FPGA design. Each memory element 1102A-1102D provides a registered output signal AQ-DQ to the interconnect structure. Because each LUT 1101A-1101D provides two output signals, O5 and O6, the LUT may be configured to function as two 5-input LUTs with five shared input signals (IN1-IN5), or as one 6-input LUT having input signals IN1-IN6.

In the embodiment of FIG. 11, each LUTM 1101A-1101D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6. When in RAM mode, each LUT functions as a single 64-bit RAM or two 32-bit RAMs with shared addressing. The RAM write data is supplied to the 64-bit RAM via input terminal DI1 (via multiplexers 1117A-1117C for LUTs 1101A-1101C), or to the two 32-bit RAMs via input terminals DI1 and DI2. RAM write operations in the LUT RAMs are controlled by clock signal CK from multiplexer 1106 and by write enable signal WEN from multiplexer 1107, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 1101A may also be provided to the general interconnect structure for shift register chaining, via output select multiplexer 1111D and CLE output terminal DMUX. The devices having programmable elements and methods of the present invention may be implemented according to the device of FIGS. 11 and 12, or in any device, including any type of integrated circuit having programmable elements.

Figure 12:
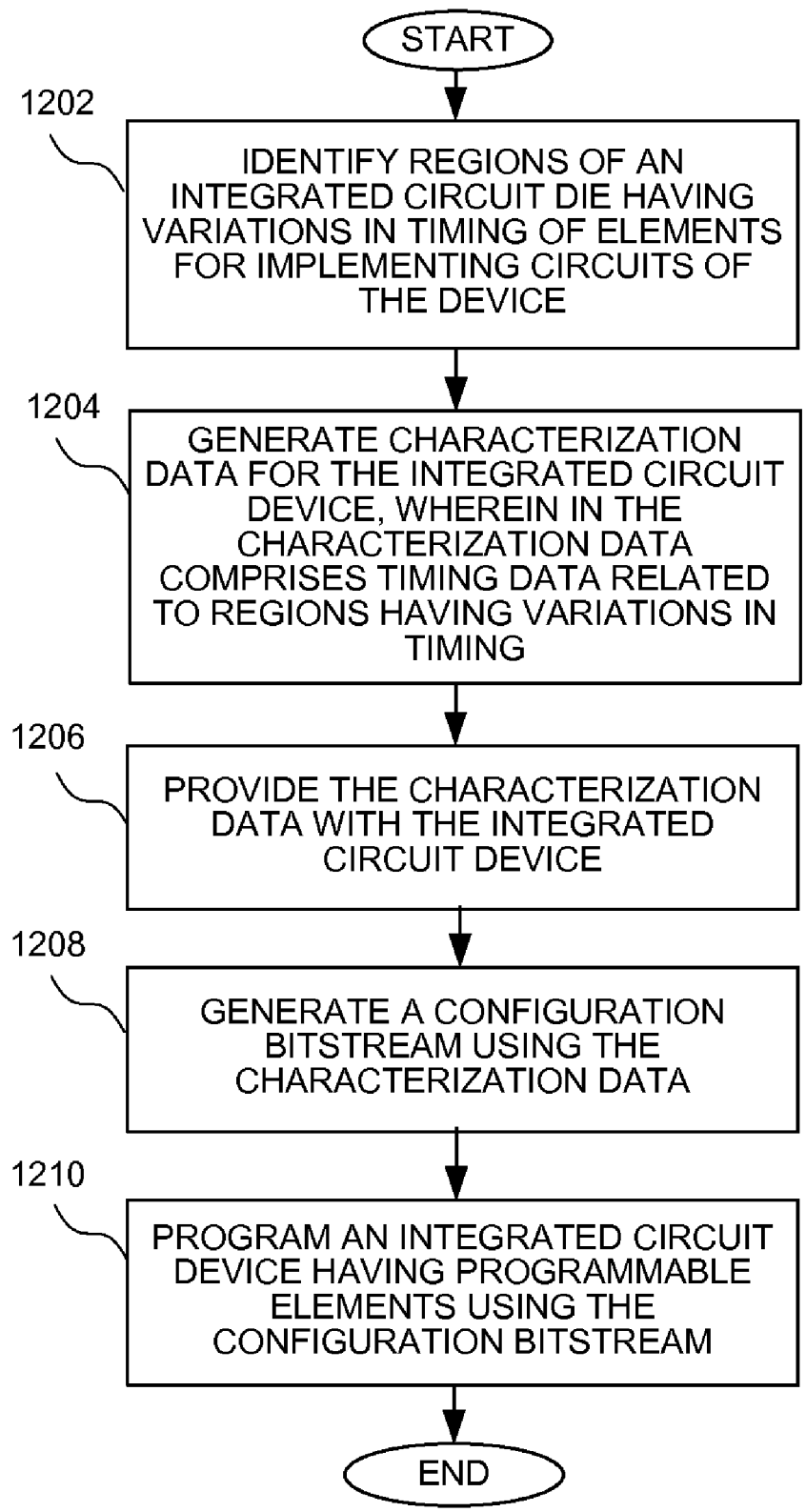
FIG. 12 is a flow chart showing a method of enabling functions of a design to be implemented in an integrated circuit device according to an embodiment of the present invention.

Turning now to FIGS. 12-15, various methods of enabling functions of a design to be implemented in an integrated circuit device are shown. The methods of FIGS. 12-15 may be implemented using the systems, circuits and tables as described above in reference to FIGS. 1-11, or using other suitable systems, circuits or tables. Referring first to FIG. 12, a flow chart shows a method of enabling functions of a design to be implemented in an integrated circuit device according to an embodiment of the present invention. In particular, regions of an integrated circuit die having variations in the timing of elements for implementing circuits of the device are identified at a step 1202. The regions may be determined using the system of FIG. 1, and may be similar to those described in relation to FIG. 2 or FIG. 10 for example. Characterization data is generated for the integrated circuit device at a step 1204, wherein the characterization data includes timing characteristics related to regions identified as having variations in timing.

The characterization data may be determined according to variety of criteria. For example, the timing characteristics of an element type could be determined based upon a minimum value for the elements in the region which is tested. Alternatively, the timing characteristics could be based upon an average value for the elements in the region. In determining the differences in timing characteristics resulting from systematic variations, only a relatively small number of the elements for each type of element in each region need to be tested. According to the embodiment of FIG. 14, the characterization data may be determined to account for both systematic and random variations of elements in the device. The characterization data may be stored in a table, such as the tables of FIGS. 7 and 8.

The characterization data is then provided with the integrated circuit devices at a step 1206. For example, the characterization data may be made available through a data sheet which is generally available from the supplier of the integrated circuit device. A configuration bitstream is generated using the characterization data at a step 1208, wherein the configuration bitstream enables the placement of circuit elements in elements of the integrated circuit device based upon characterization data associated with the elements of the device. For example, the characterization data may be used to properly place elements of the circuit design in appropriate regions according to the timing characteristics of the regions. Finally, an integrated circuit device having programmable elements is programmed using the configuration bitstream at a step 1210.

Figure 13:
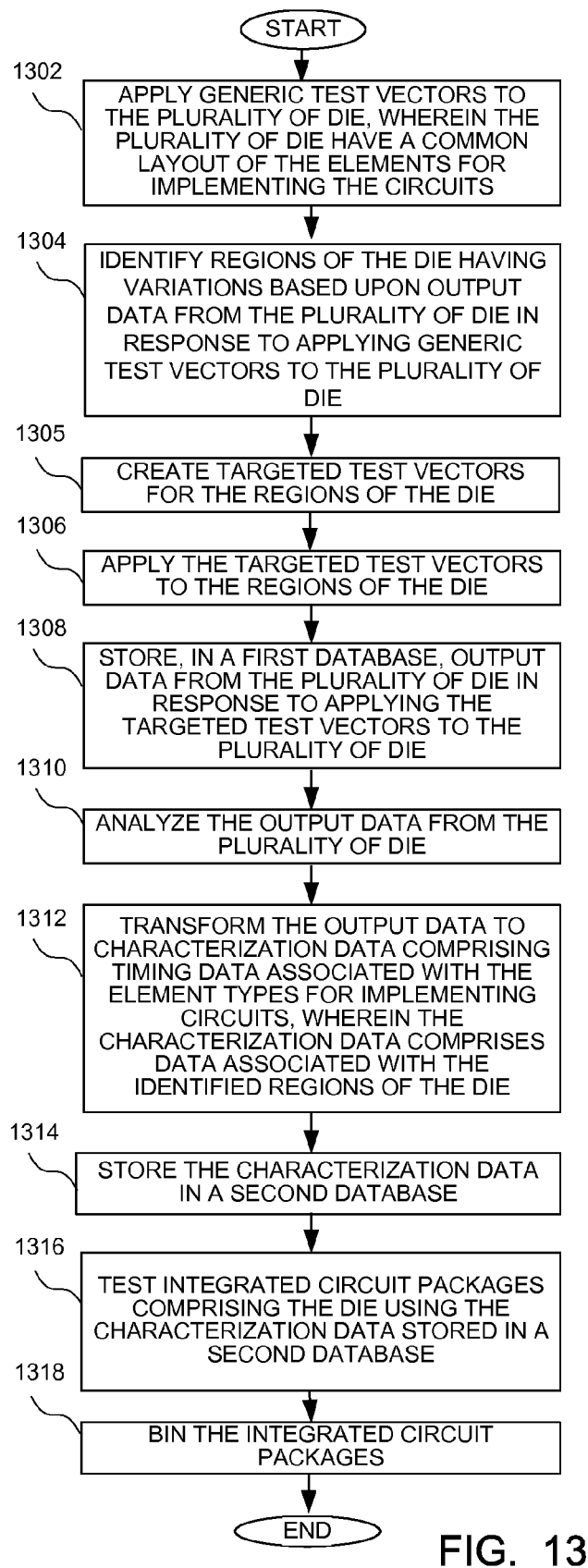
FIG. 13 is a flow chart showing a method of enabling functions of a design to be implemented in an integrated circuit device by transforming output data obtained from testing to characterization data according to an embodiment of the present invention.

FIG. 13 is a flow chart showing a method of enabling a circuit design to be implemented in an integrated circuit device by transforming output data from testing to characterization data according to an embodiment of the present invention. Generic test vectors of test inputs are applied to the plurality of dice at a step 1302, where the plurality of dice has a common layout of the elements for implementing functions of a design. Regions of the dice having delay variations are identified based upon output data from the plurality of dice received in response to the application of the generic test vectors to the plurality of dice at a step 1304. Information determined from the generic test vectors are then used to create targeted test vectors for various regions of the dice at a step 1305. Targeted test vectors are then applied to a plurality of dice at a step 1306. Output data received from the plurality of dice in response to the application of the targeted test vectors is stored in a first database at a step 1308. The output data from the plurality of dice based upon the targeted test data is analyzed at a step 1310. The output data is then transformed to characterization data including delay specifications associated with the element types for implementing circuits at a step 1312, wherein the characterization data includes data associated with the identified regions of the dice having variations. The characterization data is stored in a second database at a step 1314. Integrated circuit packages having the dice may then be tested to determine if they conform to the characterization data at a step 1316. The integrated circuit packages are then binned at a step 1318.

Figure 14:
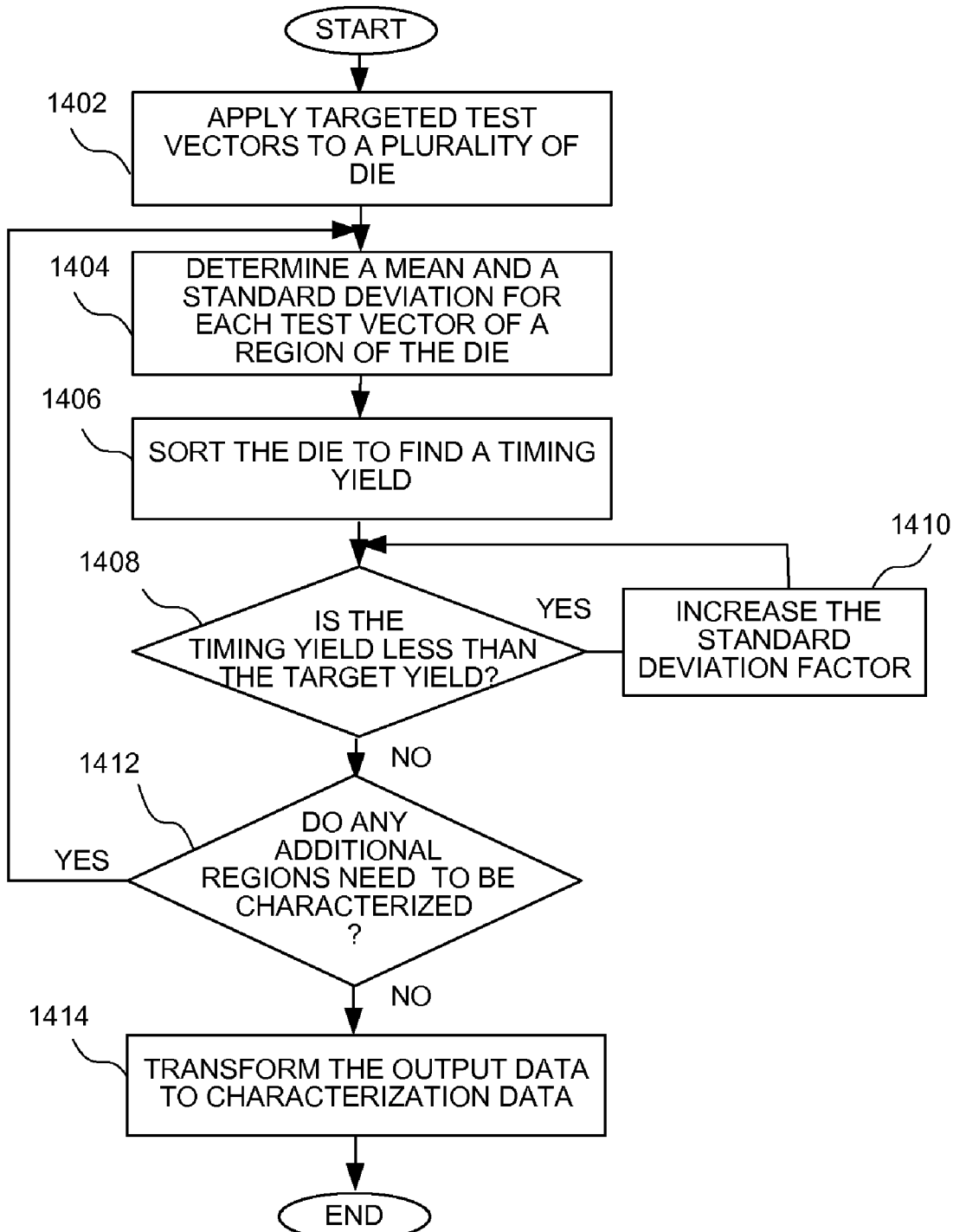
FIG. 14 is a flow chart showing a method of generating characterization data according to an embodiment of the present invention.

FIG. 14 is a flow chart showing a method of generating characterization data according to an embodiment of the present invention. As described above, integrated circuit devices experience systematic and random variations that are conventionally addressed through conservative timing characterization. According to one embodiment of the present invention, a "variation-aware" characterization of a device can produce tighter timing specifications to enable software tools to improve quality of the implementation of a circuit design in a device. However, over-tightening the timing specifications can increase timing violations and/or lower timing yield. Accordingly, the method of testing and characterizing elements of an integrated circuit device described in FIG. 14 may be used to achieve the same timing yield as conventional methods, but provide improved timing characterization.

While determining timing characteristics for a given region based upon samples in the region as described above in reference to FIG. 12 will accurately account for systematic variations, random variations may affect the timing of the elements in the region. For example, systematic variation may result in elements in a given region which appear to be 10% faster than elements in other regions. However, that region may not be 10% faster due to random variation. Accordingly, factoring random variation into the characterization data for a region will more accurately characterize the timing of the element types, and more particularly, accurately characterize the timing of element types in regions determined to have systematic variations. The method of FIG. 14 enables the optimization of timing characteristics to account for both systematic and random variations.

A conventional timing characterization of integrated circuit devices attempts to find delay specifications for each element type of the device such that a large percentage of dice do not violate any of the delay specifications. Accordingly, a small number of test instances are measured for each element type on each die. The distribution of slowest instance associated with an element type of each die is created. The delay specifications for the element types are set at some point on this distribution. For example, the output data may be set at a "mean+s*standard deviation" value, where the "s" factor is selected such that a desired timing yield is achieved. When set at a "mean+3*standard deviation," the output data for each test pattern may result in 99% of the dice being faster than the timing specifications at the test instances. Even though the test instances are not guaranteed to be the slowest on each die, the method produces acceptable timing yield because (i) the test instances are likely to be close to being the slowest, (ii) critical paths of a user design may not use the slowest path, and (iii) the path delays are averaged over slow and fast resources even when the user design uses the slowest path.

When using a conventional characterization flow for a single element type, the slowest test instance for the element type is identified on each die for a sample of Y dice. After the mean, $\mu$, and the standard deviation, $\sigma$, for the slowest instances of the Y dice are determined, the output data is set as $\mu+s\sigma$ for each test pattern, where "s" is determined based on the desired timing yield. A delay specification is determined for each delay characteristic for each element, such as those delay characteristics and elements shown in FIG. 6, based upon the output data.

In contrast to the conventional method, the variation-aware characterization according to the method of FIG. 14 attempts to find delay specifications for each element type at each instance on the die with the goal of achieving the same timing yield as conventional characterization, but specifying more aggressive delay specifications for element types in some regions of the die. By way of a particular example for a plurality of dice, 10 test patterns may be applied to each of the 16 regions, leading to 160 mean, $\mu$, and 160 standard deviation, $\sigma$, values, one for each of the 10 test patterns in each of the 16 regions. If the characterization data is based upon 10,000 dice, then each of the 160 mean values and the 160 sigma values will be based upon 10,000 data points. Due to systematic variation, elements in some regions are consistently faster than others, making it possible to identify fast locations. However, due to the existence of random variation, no single region will always have the fastest or the slowest elements. Therefore, because of random variation, simply setting the delay specifications of each region based upon μ+sσ of the output data will not achieve the same timing yield as expected from the conventional method. That is, by testing each element of each die, the actual timing characteristics in a region may be determined to be different than expected, where the difference is a result of random variation. Accordingly, the sample dice are empirically sorted to find a new standard deviation factor value, s', such that μ+s'σ for the output data will achieve the desired timing yield. It should be noted that the timing characterization for the elements may be faster while still achieving the timing yield.

Referring specifically to the flow chart of FIG. 14, targeted test vectors are applied to each region of the die for each of the Y dice at a step 1402. A mean μ and standard deviation σ for each targeted test vector in a region are determined at a step 1404 After initializing s' to the value used in the conventional characterization to achieve the desired target yield (e.g. s'=3 for a 99% timing yield), the dice are sorted to find a timing yield based upon the μ+s'σ for the region at a step 1406. Because the mean value may be different when evaluating timing values for a significant amount of data in order to take random variation into account, a new s' is determined so that the μ+s'σ results in the desired timing yield. It is then determined whether the timing yield is less than the target yield based upon a current value of s' at a step 1408. It should be noted that timing yield is the percentage of good dice of the sample, and a die is determined to be bad if there exists an element of a plurality of elements in the region such that the delay for that element does not meet the timing characteristics. If the timing yield is less than the target yield, the standard deviation factor s' is increased at a step 1410. That is, because the goal is to achieve the desired timing yield, the standard deviation factor s' is increased (and therefore provides slower delay specifications for the elements) to ensure that the characterization data is set such that the desired timing yield is achieved. If the timing yield is not less than the target yield, it is then determined if there are any additional regions for which characterization data needs to be generated at a step 1412. If so, a mean and standard deviation for each targeted test vector of another region of the die are determined at the step 1404. If not, the output data is transformed to characterization data at a step 1414. That is, after the values of the output data are set according to the determined s' value, the output data is transformed to characterization data according to the element types and regions as set forth above.

The method of FIG. 14 can lead to characterization data having certain regions which are faster than what would be designated using a conventional method. For example, applying the method of FIG. 14 to a sample of 9000 Xilinx 5VLX330T FPGAs, a region-based characterization would specify a delay having 3.7 sigma variation, compared to a delay having 3 sigma variation based upon the conventional characterization. However, even having a delay with a 3.7 sigma variation, the delay specifications may be as much as 7% faster. That is, because the mean value is calculated based upon delay data for each element of the region to account for random variation, the mean may be greater, leading to faster delay specifications even with a larger standard deviation factor s'.

While the embodiment of FIG. 14 will typically result in faster delay specifications, the method is actually more conservative than the conventional characterization by guaranteeing that none of the elements in a region violates the specification. In contrast, the conventional characterization only guarantees that a small subset of the elements does not violate the specification. While the embodiment of FIG. 14 finds a delay of each element of each die, it is possible to use a subset N elements of the on-die, provided that N is large enough to provide high resolution of the on-die variation. For example, in a Xilinx 5VLX330 FPGA, if an element such as a LUT is characterized in every CLB, then 240*108=25,920 elements must be characterized. If an element is characterized in every 2×2 CLB cluster, then a subset of N=120*54=6480 elements must be characterized. Therefore, the method of FIG. 14 may be modified such that the characterization data is generated based upon the testing of only a subset N of the elements. Applying the modified method of FIG. 14 to the same 9000 Xilinx 5VLX330T, the region-based characterization must specify a delay at 3.3 sigma to achieve the same yield However, even at 3.3 sigma, the delay specifications may be as much as 10% faster than conventional characterization. Since overall quality of the integrated circuit may depend on different timing in different regions differently, the embodiment of FIG. 14 may assign different sigma values to different regions. For example, while some delays are set to 3.3 sigma above a mean value, the delays in infrequently-used corner regions may be set to only 2.8 sigma above the mean.

Figure 15:
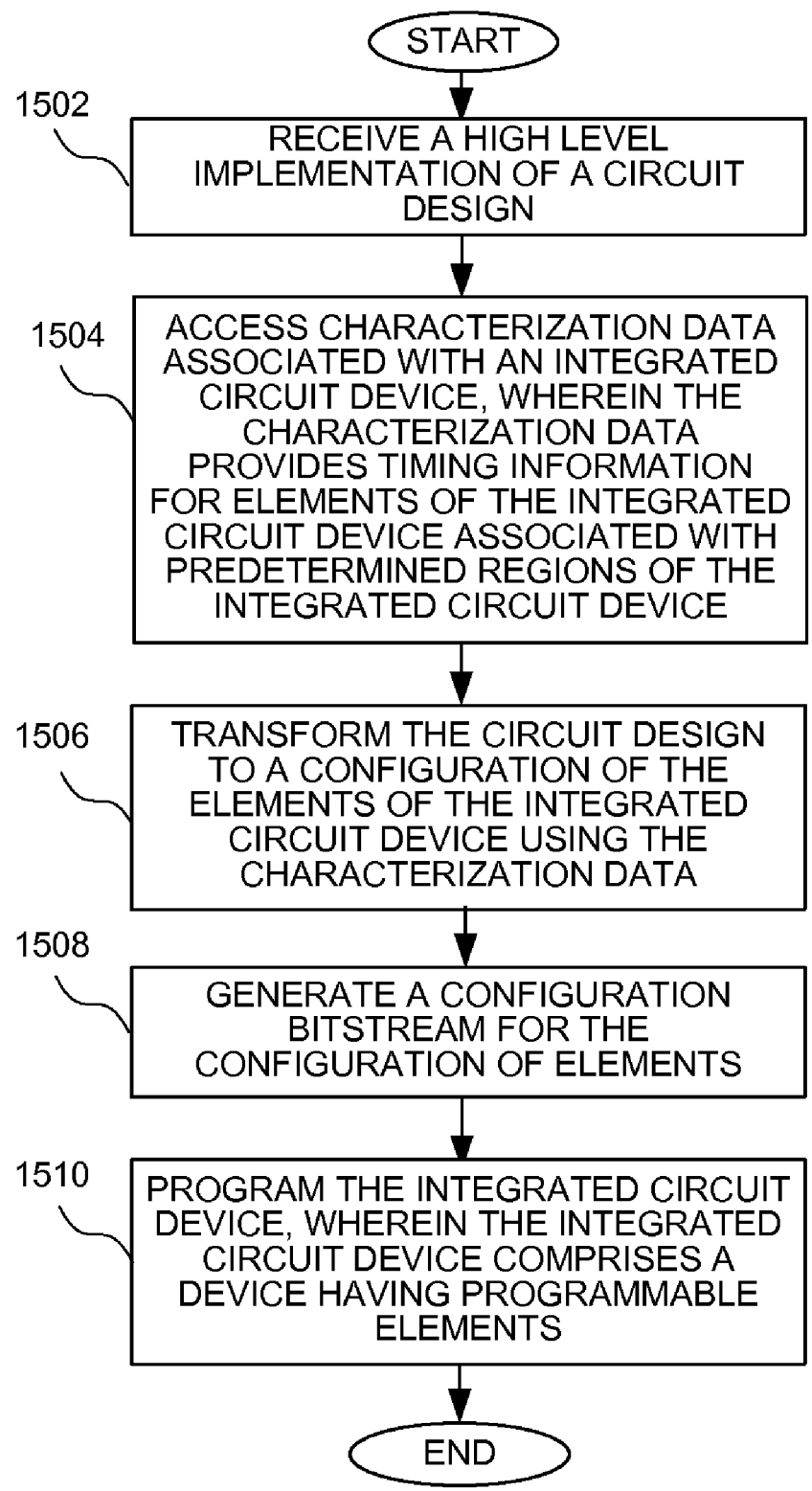
FIG. 15 is a flow chart showing a method of enabling a circuit design to be implemented in an integrated circuit device by generating a configuration bitstream using characterization data according to an embodiment of the present invention.

Finally, FIG. 15 is a flow chart showing a method of enabling a circuit design to be implemented in an integrated circuit device by generating a configuration bitstream using characterization data associated with regions of a die according to an embodiment of the present invention. The method of FIG. 15 could be implemented as described in reference to FIG. 9, for example. A high level implementation of the circuit design is received at a step 1502. Characterization data associated with the integrated circuit device is accessed at a step 1504, wherein the characterization data provides timing information for elements of the integrated circuit device associated with predetermined regions of the integrated circuit device. The circuit design is then transformed to a configuration of the elements of the integrated circuit device at a step 1506. The elements of the integrated circuit devices can include the elements of FIG. 10, for example. A configuration bitstream for the configuration of the elements is generated at a step 1508. Finally, the integrated circuit device is programmed at a step 1510, wherein the integrated circuit device comprises a device having programmable elements.

It can therefore be appreciated that the new and novel method of enabling functions of a design to be implemented in an integrated circuit device has been described. It will be appreciated by those skilled in the art that numerous alternatives and equivalents will be seen to exist which incorporate the disclosed invention. As a result, the invention is not to be limited by the foregoing embodiments, but only by the following claims.

What is claimed is:

1. A computer implemented method of enabling functions of a design to be implemented in an integrated circuit device, the method comprising:
  applying test data to a plurality of dice having different element types for implementing circuits, wherein the plurality of dice have a common layout of the different element types for implementing the circuits;
  receiving output data from the plurality of dice in response to applying the test data to the plurality of dice;
  analyzing the output data from the plurality of dice;
  transforming by a computer the output data to characterization data comprising timing data associated with the different element types for implementing circuits, wherein the characterization data comprises data associated with regions of the plurality of dice, and
  storing the characterization data.

2. The method of claim 1, wherein transforming the output data to characterization data comprises generating the characterization data for the plurality of dice based upon systematic variations in timing characteristics of the different element types.

3. The method of claim 1, wherein transforming the output data to characterization data comprises generating the characterization data for the plurality of dice based upon random variations in timing characteristics of the different element types.

4. The method of claim 1, further comprising testing integrated circuit packages using the characterization data.

5. The method of claim 1, further comprising applying generic test vectors to the plurality of dice before applying the test data to the plurality of dice.

6. The method of claim 5, further comprising identifying the regions of the plurality of dice based upon initial output data from the plurality of dice in response to applying the generic test vectors to the plurality of dice.

7. The method of claim 6, wherein applying test data comprises applying targeted test vectors to the regions.

8. A computer implemented method of enabling functions of a design to be implemented in an integrated circuit device, the method comprising:
   receiving a high level implementation of a circuit design;
   accessing characterization data associated with the integrated circuit device, wherein the characterization data provides timing information associated with regions of the integrated circuit device for different element types of the integrated circuit device;
   transforming by a computer the high level implementation of the circuit design to a configuration of the different element types of the integrated circuit device;
   generating a configuration bitstream for the integrated circuit device based upon the configuration of the different element types; and
   storing the configuration bitstream.

9. The method of claim 8, wherein accessing characterization data comprises accessing data which accounts for systematic variation between timing characteristics for the different element types in the regions of the integrated circuit device.

10. The method of claim 8, wherein accessing characterization data comprises accessing data which accounts for random variation between timing characteristics for the different element types in the predetermined regions of the integrated circuit device.

11. The method of claim 8, wherein transforming the high level implementation of the circuit design comprises determining a placement of the circuit design based upon the timing information associated with the regions.

12. The method of claim 8, wherein transforming the high level implementation of the circuit design comprises placing portions of the circuit design having stricter timing requirements in a faster region of the regions of the dice.

13. The method of claim 8, further comprising programming the integrated circuit device, wherein the integrated circuit device comprises a device having programmable elements.

14. A computer program product, comprising:
   a computer-readable medium storing computer-executable program code that enables functions of a design to be implemented in an integrated circuit, the computer-executable code comprising instructions that when executed by a computer cause the computer to perform operations including:
      applying test data to a plurality of dice having different element types for implementing circuits, wherein the plurality of dice have a common layout of the different element types for implementing circuits;
      receiving output data from the plurality of dice in response to applying the test data to the plurality of dice;
      analyzing the output data from the plurality of dice; and
      transforming the output data to characterization data comprising timing data associated with the different element types for implementing circuits, wherein the characterization data comprises data associated with regions of the plurality of dice.

15. The computer program product of claim 14, wherein the operation of transforming the output data to characterization data comprises generating the characterization data for the plurality of dice based upon systematic variations in timing characteristics of the different element types.

16. The computer program product of claim 14, wherein the operation of transforming the output data to characterization data comprises generating the characterization data for the plurality of dice based upon random variations in timing characteristics of the different element types.

17. The computer program product of claim 14, wherein the operations further include testing integrated circuit packages comprising dice implemented by using the characterization data.

18. The computer program product of claim 14, wherein the operations further include applying generic test vectors to the plurality of dice before applying the test data to the plurality of dice.

19. The computer program product of claim 18, wherein the operations further include identifying the regions of the plurality of dice based upon initial output data from the plurality of dice in response to applying the generic test vectors to the plurality of dice.

20. The computer program product of claim 19, wherein the operation of applying test data comprises applying targeted test vectors to the predetermined regions.

* * * * *